Aug. 13, 1935.  E. MENDENHALL ET AL  2,011,341

OIL FILLED ELECTRIC MOTOR STRUCTURE

Filed March 26, 1934  2 Sheets-Sheet 1

INVENTORS
EARL MENDENHALL
JUNIUS B. VAN HORN
BY

ATTORNEY.

UNITED STATES PATENT OFFICE 2,011,341

OIL-FILLED ELECTRIC MOTOR STRUCTURE

Earl Mendenhall, Los Angeles, and Junius B. Van Horn, Alhambra, Calif., assignors to Menhorn, Inc., Los Angeles, Calif., a corporation of California Application March 26, 1934, Serial No. 717,412

31 Claims. (Cl. 172—36)

Our invention relates to a novel method and apparatus for decreasing skin-friction losses in a gap between two relatively moving bodies, and especially to a novel method and apparatus which finds particular utility in decreasing skin-friction losses in a dynamo-electric machine subjected to relatively high pressures. Such an embodiment will be particularly shown and described for the purpose of definiteness, though it will be clear that the principles and structures to be hereinafter described find utility in other capacities and structures, it being the primary object of the present invention to provide a novel method and apparatus for reducing skin-friction losses between two bodies moving relative to each other in close proximity.

One type of installation in which the invention finds particular utility is in the deep-well pumping art. One method of pumping liquid from a well is to directly connect a submersible motor to a pump, and lower the entire unit into the well liquid. It is the usual practice to fill such a motor with oil or other dielectric liquid, and to maintain thereon a pressure equal to or greater than the pressure of the external liquid at the depth of submergence, or, in some instances equal to or greater than the discharge pressure of the pump. Considerable internal pressure is thus developed in such installations.

In such an oil-filled motor the skin-friction losses in the gap between the rotor and the stator are sometimes large, especially when the motor must develop 100 H. P. or more and when the motor must necessarily be elongated in vertical dimension due to the limited space available in the well. In the smaller installations such skin-friction loss is ordinarily small, but in larger installations installed in deep wells the skin-friction losses often amount to from 5 to 15%. So also, on high speed installations the skin-friction losses are very material, these losses increasing approximately as the third power of the angular velocity.

To decrease this skin friction, attempts have been made to use a dielectric medium of such character that it expels vapors or gases at the temperatures developed in the gap, thus wholly or partially filling this gap with a vaporous material, or, in some instances, with a foam formed by agitation of such vaporous material with the liquid. However, under the high internal pressures necessary when pumping deep wells, this excessive pressure tends to prevent the expelling of such vapors. Thus, in order that the vaporous material will be expelled, the vapor pressure of the dielectric liquid at the temperature in the gap must be somewhat greater than the pressure existing in this gap. Excessive pressure tends to retard the expelling of the vaporous material and tends to raise the necessary vaporizing temperature to such an extent that available temperatures in the motor are not sufficient to produce the desired vaporous material.

It is an object of the present invention to provide an auxiliary pump means for decreasing the pressure in or adjacent such a gap to such an extent that the vaporous material can be expelled.

It is a further object of the present invention to provide an auxiliary heater, if necessary, which can be used to preliminarily heat the dielectric medium to a point just below the vaporizing or gas-expelling temperature, allowing the heat in the gap to further raise the temperature to the vaporizing point, or to use an auxiliary heater which in itself raises the temperature to a degree sufficient to expel the vaporous material.

It is a further object of the invention to provide a novel method of thus preliminarily heating the dielectric liquid.

In accomplishing these results, we find it desirable to enclose the entire motor, or at least the rotor thereof, in an inner chamber from which the auxiliary pump means intakes. It is not essential, when using a vaporizable dielectric, to completely evacuate such a chamber by drawing out all of the liquid therefrom. A decrease in the pressure in such an inner chamber is all that is ordinarily needed. However, the auxiliary pump inevitably forces liquid from this chamber due both to the fact that some of the liquid must be expelled in order that the pressure will be decreased and to the fact that the vaporous material formed in or adjacent the gap displaces a portion of the dielectric liquid otherwise filling this inner chamber.

It is an object of the present invention to provide a storage chamber into which the liquid pumped by the auxiliary pump may move, regardless of whether a pressure-equalized system or a pressure-unbalanced system is used.

If an unbalanced system is used, it is an object of the present invention to use the auxiliary pump for building up the desired differential pressure, this differential pressure often being desirable to prevent entrance of any of the external liquid into the motor shell through minute imperfections of the motor shell or through whatever sealing means is used for sealing the junction of the shaft and the motor shell.

In this connection it is often desirable to extend this storage chamber upward in the well, often completely to the top of the well, and the provision of such a system is within the objects of the present invention.

It is a further object of the present invention to position the bearings for the shaft outside the inner chamber so that they will be lubricated by the dielectric liquid rather than being in the space containing the vaporous material.

It is a further object of the present invention to provide a novel circulation system whereby the vaporous material is cooled or condensed so as to reunite with the dielectric liquid.

It is a further object of the invention to provide an auxiliary pump for drawing a dielectric medium into the inner chamber, and to suitably throttle the incoming dielectric liquid.

Still a further object of the invention resides in the manner of introducing the incoming dielectric liquid into the inner chamber so that it is heated by the rotor or by any auxiliary means positioned therein.

It is still a further object of the invention to introduce such a dielectric liquid into the inner chamber in such a manner that at least a portion of this dielectric liquid can flow through ports formed through the rotor, so that in some instances at least some vaporization may take place in these ports rather than in the gap.

It should not be understood, however, that all features of the present invention are limited to a system utilizing a dielectric capable of vaporizing when subjected to the temperatures present in the motor structure. Thus, we believe it to be novel to utilize an auxiliary pump in connection with an inner chamber which surrounds only the rotor of a dynamo-electric motor, this auxiliary pump changing the pressure in this inner chamber, and it is an object of the present invention to provide such a structure regardless of whether or not a vaporizable dielectric is utilized.

It is a further object of the invention to provide an auxiliary pump means which not only withdraws liquid from the inner chamber, but expels this liquid into a storage system, the storage system and the auxiliary pump cooperating in building up a differential pressure on opposite sides of the seal or on opposite sides of the motor shell or between the dielectric liquid and the liquid being pumped by the main pump driven by the motor, this combination not being necessarily limited to the use of a vaporizable dielectric liquid.

So also, certain features of the invention are not limited to the use of an auxiliary pump. Such features include the circulation system shown, the novel structure enclosing the rotor, the novel auxiliary heating means disclosed, etc.

Similarly, other features to be shown and described hereinafter are not limited to the use of such a vaporizable dielectric.

Other objects and advantages of the invention will be made evident hereinafter.

Referring to the drawings.

Figure 1:
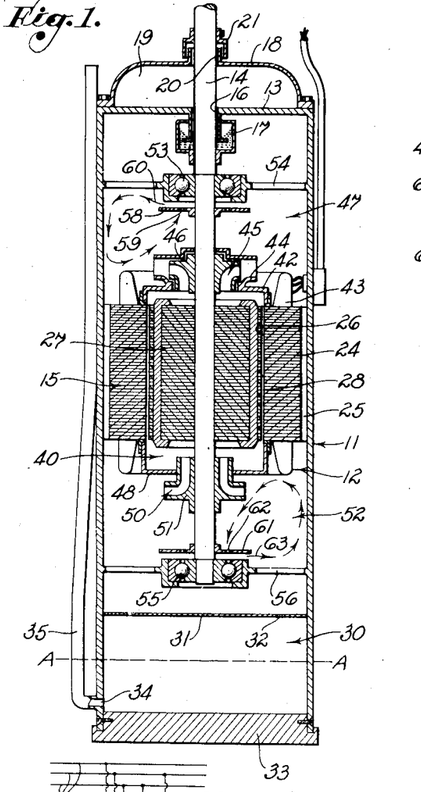
Fig. 1 is a vertical sectional view showing a submersible motor embodying the features of the invention.

In the embodiment of the invention shown in Fig. 1, a motor shell 11 is employed to form a motor chamber 12, the upper end of this motor shell being closed by an upper wall 13 through which a shaft 14 extends, so that a motor 15 within the motor chamber 12 may drive any suitable mechanism such as a deep well pump situated exterior and above the motor shell. The upper wall 13 is provided with an opening 16 through which the shaft 14 extends. A sealing means 17 is provided for the opening 16, which sealing means resists entry of external liquid into the motor chamber 12 and serves to separate the external fluid outside the motor shell 11, such as the water in a well, from the internal fluid inside the motor shell and which is ordinarily a dielectric oil of a character to be hereinafter described. Any suitable sealing means may be used in this connection, but we prefer to utilize a fluid-packed seal such as indicated to insure positive separation of the internal and external fluids. The form of seal illustrated is of the mercury type and includes a rotating cup which carries a body of mercury, there being an apron extending downward from the top wall 13 to a position beneath the surface of this mercury. Other types of seals may, however, be utilized in this connection.

We have shown a hood or cover 18 above the upper wall 13. The shaft 14 extends upward through this hood, and it is preferable to provide a structure which prevents any foreign matter from entering a chamber 19 formed by this hood. Such a protecting structure may include an upward extending tube 20 and an inverted cup 21 rotating with the shaft and extending downward over the upper portion of this tube.

The motor 15 may comprise a stator 24 mounted in the motor shell 11 by any suitable means. The exterior of this stator is shown as providing grooves 25 through which the dielectric liquid may move in cooling relationship with the stator. So also, the stator provides a rotor opening 26 in which is positioned a rotor 27 of slightly smaller diameter than the opening so as to provide a gap 28 therebetween. This rotor is secured to the shaft 14 by any suitable means, not shown.

If such a motor shell is filled with dielectric oil, the gap 28 will also be filled and the resulting skin friction is excessively high, especially at high shaft speeds or when it is necessary to utilize a motor developing a large amount of power. So also, the upper and lower ends of the rotor 27 would be contacted by such a dielectric oil to further increase the frictional drag on the rotor. In overcoming these defects, the present invention utilizes a dielectric liquid of such character that it will expel a vaporous material comprising vapors or gases when subjected to temperatures which it is possible to maintain inside the motor shell. In some instances, it is possible to use as a dielectric liquid one of the lower boiling-point hydrocarbons which has a sufficient dielectric strength and which will vaporize to form this vaporous material when subjected to these temperatures. Such a dielectric liquid may be a gasoline suitably refined to give it the necessary dielectric strength, a quantity of oil being mixed with this gasoline, if desired, to increase the lubricating qualities of the liquid. In other instances this dielectric liquid may constitute a dielectric oil, such as transformer oil or other carrier liquid of high dielectric strength, in which has been dissolved a quantity of some auxiliary substance, such as one of the more volatile hydrocarbons. Such an auxiliary substance may be either a liquid or a gas. If it constitutes a liquid it may be one which dissolves in the carrier liquid to form a chemical solution and which will, under the conditions of temperature and pressure in or adjacent the gap, liberate a vaporous material. If it is a gas, this gas may go into solution in the carrier liquid and will, under the conditions of temperature and pressure existing in the gap, liberate a vaporous material which will be in the form of a gas.

For instance, it is entirely practical to use a carrier liquid comprising a dielectric oil mixed with one or more auxiliary substances, such as methane, propane, butane, pentane, hexane, ethylene, propylene, butylene, and amyline. Such an auxiliary substance may also comprise certain of the gasolines or other low boiling-point hydrocarbons, such as commercial petroleum ether. Other auxiliary substances may be utilized and it will be understood that the above list is not exhaustive. The particular constituents of the dielectric liquid will often vary with different installations, factors which should be taken into account being the available temperatures, the pressure in or adjacent the gap, the immiscibility of the auxiliary liquid with water or other conducting liquid, etc. An almost unlimited number of various auxiliary substances can be used, it being often possible to form an auxiliary substance having the desired properties by synthetic methods known to industrial chemists. Such special auxiliary substances can be synthesized to meet any particular state of conditions in a particular installation.

In many installations it is desirable to maintain the pressure inside the motor shell 11 substantially equal to the pressure of the external fluid in which the structure is submerged. Such an installation is shown in Fig. 1, pressure equalization being effected by the use of a balance or storage chamber 30 formed in the lower end of the shell 11 between a wall 31 having one or more ports 32 therein and a lower wall 33 closing the lower end of this shell. If desired, this chamber may contain contacting bodies of the dielectric liquid and the external fluid, the surface of contact being indicated by the line A—A. It is preferable to maintain the body of external fluid in open communication with the external fluid outside the motor shell 11. This may be accomplished by providing an opening 34 directly communicating with the external fluid outside the shell. Preferably, however, we provide a pipe 35 in open communication with the lower end of the chamber 30 through the opening 34 and extending upward to a position at or near the top of the motor shell at which position this pipe opens on the external fluid. This prevents drainage from the motor shell during the installation period, and also allows an open communication between the external fluid outside the motor shell and the body of external fluid in the bottom of the chamber 30. However, if the depth of submergence of such a system is large, the pressures built up inside the motor shell will retard the expelling of the vaporous material. As these internal pressures are increased, the heat necessary to expel such vaporous material from the dielectric liquid will increase. If the motor windings themselves are utilized for heating the dielectric liquid, it may well be that there is insufficient heat available to expel the vaporous material at pressures developed inside the motor shell.

To compensate for this difficulty we provide an auxiliary pumping means for reducing the pressure in at least a portion of the motor shell 11 so as to permit the available heat to expel this vaporous material. This may be accomplished by providing an inner chamber surrounding the motor or surrounding the rotor space thereof. In the form of the invention shown in Fig. 1 an inner chamber 40 is formed only around the rotor space, though this chamber may be extended to include the stator windings if desired. Preferably, however, the inner chamber 40 encloses only the rotor, thus permitting better cooling of the stator windings by the dielectric liquid. As shown, this inner chamber is bounded at its upper end by a wall 42 which extends upward from the upper end of the stator 24 at a position immediately inside the upper portion of a stator winding 43 of conventional form, this wall 42 also extending inward toward the shaft 14. Suitably connected to this wall we have shown a pump casing 44 of an auxiliary pump 45. An impeller 46 is suitably secured to the shaft so as to rotate in the pump casing 44 and decrease the pressure in the inner chamber 40, any material which is drawn from the upper end of this chamber being discharged from the pump casing 44 into an upper cooling chamber 47. Preferably the wall 42 and the auxiliary pump 45 are positioned relatively close to the stator so that the upper end of the inner chamber 40 is small.

Similarly, in Fig. 1 we have shown a lower wall 48 extending downward from the lower portion of the stator 24 and inward toward the shaft 14, thus defining the lower end of the inner chamber 40. If desired, the walls 42 and 48 may be joined by a thin cylindrical member extending through the gap 28, though this is not necessary. An auxiliary pumping means 50 is shown as comprising an impeller 51 secured to the shaft and intaking from the lower end of the inner chamber 40, this impeller rotating in close proximity to the lower wall 48, there being a suitable packing means between this impeller and the lower wall 48 to prevent excessive leakage, if desired. While no pump casing is shown around the impeller 51, such a casing similar to that indicated by the numeral 44 can be used. This impeller 51 discharges into a lower cooling chamber 52 formed below the stator 24.

It is preferable to journal the shaft 14 outside the inner chamber 40 but inside the motor shell 11 so that the dielectric liquid will at all times lubricate the bearing means employed. This may be accomplished by providing an upper bearing 53 above the inner chamber 40 and supported in the motor shell 11 by any suitable means, such as by arms 54. Similarly, a lower bearing 55 may be supported by any suitable means such as arms 56 below the inner chamber 40. The liquid in which the motor shell 11 is submerged is ordinarily quite cool and serves to very efficiently cool the motor by withdrawing heat through the walls of the motor shell 11.

It is especially desirable that the upper and lower cooling chambers 47 and 52 be maintained relatively cool, both for the purpose of cooling the stator winding 43 and for cooling any of the vaporous material to condense same or cause it to reunite with the dielectric liquid. In some instances the auxiliary pumps 45 and 50 set up a sufficient circulation in these chambers to insure adequate cooling of the dielectric liquid therein. In other instances, it is desirable to utilize some supplementary means for establishing a circulation in these chambers. In this connection, Fig. 1 discloses a plate 58 including openings 59 through which the dielectric material may flow, this plate being secured to the shaft and being spaced adjacent some stationary part of the structure so that the dielectric liquid therebetween will move through the openings 59 and outward as indicated by the arrows 60, thus setting up a closed circulation path in the cooling chamber 47 which adequately cools the windings 43 of the stator. Similarly, a plate 61 is shown in the lower cooling chamber 52 rotating in spaced relationship with the bearing 55 so that dielectric liquid is drained through openings 62 of this plate and forced outward as indicated by the arrows 63 to set up a closed circulation path in the lower circulation chamber 52.

In considering the operation of this form of the invention it will be clear that when the motor is stationary the dielectric liquid will tend to fill the inner chamber 40 and the gap 28. As soon as the motor is energized, however, the auxiliary pumps 45 and 50 tend to decrease the pressure in the inner chamber 40, and, as the motor warms up, sufficient heat is generated to form the vaporous material in at least a portion of the inner chamber 40. The hottest part of this chamber will usually be in the gap 28, and this gap will be wholly or partially filled with the vaporous material expelled from the dielectric liquid, thus precluding filling of this gap by a liquid which would develop considerable skin friction. Such vaporous material may be either a vapor or a gas, as above mentioned, or in some instances may comprise a foam formed due to the agitation of the vapor or gas with any liquid remaining in the gap, this foam at least partially filling the gap 28. So also, after the motor has been operating for a period of time the material in the upper and lower portions of this inner chamber 40 may comprise a vaporous material in which event the rotor 27 will be entirely surrounded by an atmosphere of this vaporous material. Any of the vaporous material discharged from the auxiliary pumps will be cooled in the circulating chambers 47 and 52 and thereby recondensed or recombined with the dielectric liquid. If desired, one of the auxiliary pumps 45 or 50 may be of greater pumping capacity than the other so that a small net flow through the inner chamber 40 will take place. The incoming dielectric liquid will be subjected to the temperatures in this inner chamber and will form an additional supply of vaporous material.

Figure 2:
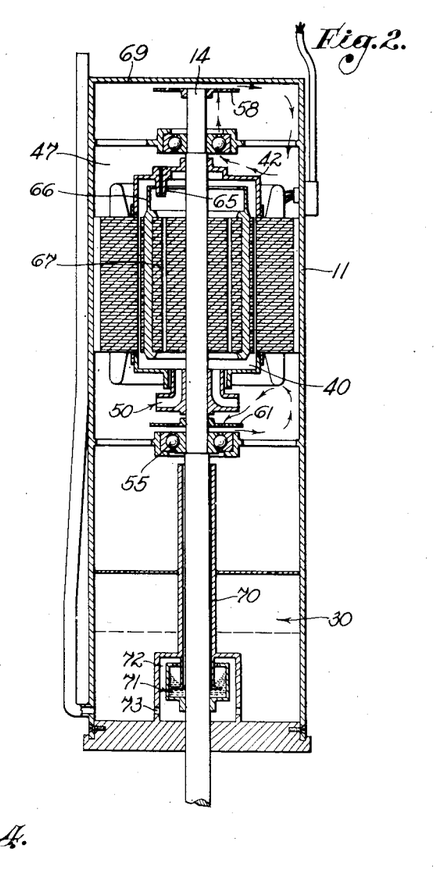
Fig. 2 is a vertical sectional view of an alternative form of the invention.

As mentioned above, it is not necessary that the pumps 45 and 50 completely evacuate the inner chamber when a vaporizable or gas-expelling dielectric is utilized. It is only necessary in this connection to decrease the pressure in this chamber sufficiently so that the expelling of the vaporous material will be possible at the temperatures available in this inner chamber, A modified form of the invention is shown in Fig. 2, this form showing the shaft 14 extending downward from the motor shell 11. In this form of the invention the upper wall 42 extends inward into close proximity to the shaft 14, and, if desired, may be sealed with respect thereto. Usually, however, it is not necessary to form a completely effective seal, for a slight leakage through the annular clearance space around the shaft at this point will not be objectionable. Only one auxiliary pump is shown in this form of the invention, this auxiliary pump corresponding to the pump 50 previously described, this pump acting to withdraw material from the lower end of the inner chamber 40.

To permit a throttled flow of dielectric liquid into the inner chamber 40 we use either the throttle passage formed at the junction of the shaft and the upper wall or we use a pipe 65 communicating with the upper cooling space 47, the opening of this pipe being relatively small so as to throttle the inflowing dielectric liquid, or both a throttle passage and the pipe may be used. This pipe may discharge directly into the gap. In the preferred embodiment, however, the rotor provides an upward extending flange 66 forming a cup in the upper end thereof into which this throttled dielectric liquid flows. So also, it is sometimes preferable to provide passages 67 extending downward through the rotor 27. In this form of the invention heating and consequent vaporization of at least a portion of the dielectric liquid may take place in these passages 67. Any excess of dielectric medium supplied through the pipe 65 merely flows downward through these passages or overflows the cup formed by the flange 66 and is withdrawn by the auxiliary pump 50. The desired pressure differential between the inner chamber 40 and the dielectric liquid outside thereof can be controlled by suitable design of the auxiliary pump 50, in conjunction with the size of the throttle passages delivering dielectric liquid to this inner chamber.

In this form of the invention the supplementary means for establishing a definite circulation path in the cooling chambers 47 and 52 may be formed as indicated, the plate 58 rotating in close proximity to an upper wall 69 completely closing the top of the motor shell 11 and cooperating therewith in setting up the circulation previously described. The plate 61 may be mounted directly above the bearing 55 as described with reference to Fig. 1. In this form of the invention a pipe 70 is shown surrounding the shaft 14 and extending through the balance or storage chamber 30 from the space immediately below the bearing 55. A suitable seal 71 may be positioned in a sealing chamber 72 defined at the lower end of this pipe 70 and may be of the form previously described. The chamber 72 may communicate with the body of external fluid in the chamber 30 through passages 73 if desired, the seal 71 being effective in preventing any of this external fluid from rising to the motor.

Figure 4:
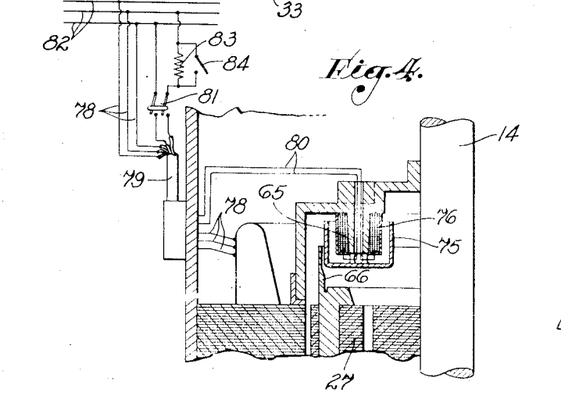
Fig. 4 is a fragmentary sectional view of an auxiliary heating means which can be used in conjunction with the form illustrated in Fig. 2.

In many instances it is desirable to utilize an auxiliary heating means to insure sufficient temperatures to effect expelling the vaporous material. Such an auxiliary heating means may be applied to the form of the invention shown in Fig. 2, the throttled flow of incoming dielectric liquid being heated by a construction such as shown in Fig. 4. Here the pipe 65 discharges into a cup 75 which extends upward around a portion of this pipe. A heater 76, preferably of the electrical type, may be positioned around the pipe 65 so as to preliminarily heat the dielectric liquid flowing therethrough. This liquid is further heated by the heater 76 while retained in the cup 75, but when this cup is filled the excess dielectric liquid will drop into the rotating cup defined by the flange 66 of the rotor 27, as previously described. Any suitable means may be utilized for controlling the energization of the heater 76. In some instances it is possible to energize this heater by connecting it across the leads supplying current to the motor, these leads being indicated by the numeral 78 and extending upward from the motor shell through a conduit 79. In other instances it is desirable to be able to separately energize the heating means from the surface of the ground if the motor is installed in a well. This may be accomplished by extending leads 80 connected to the heater 76 upward through the conduit 79 so that these leads can be separately energized. If desired, these leads may extend upward through the opening of the pipe 65, as shown in Fig. 4, and may extend upward through the conduit 79, being connected to a switch 81 to a supply line 82, the motor also being energized from this supply line by the leads 78. If desired, a resistor 83 may be connected in one of the leads 80, preferably being paralleled by a switch 84.

Such a construction finds particular utility in certain installations, for it permits the liquid in the inner chamber 40, when the motor is stationary, to be preliminarily heated. In some instances this liquid may be merely preliminarily heated to reduce the viscosity thereof so as to permit easier starting of the motor. This can be accomplished by closing the switch 81 when the switch 84 is open. Such a mode of operation allows the vaporous material to be formed soon after the motor is energized inasmuch as a smaller amount of heat is required from the motor windings than would otherwise be the case. In fact, if desired the dielectric liquid in the inner chamber 40 may be heated by the heater 76 to a temperature just below the temperature at which the vaporous material is expelled, allowing the windings of the motor to supply only the small amount of heat necessary to raise this liquid to the proper temperature. It will be understood that the motor can be operated continuously under such conditions.

However, it is also possible to use the system shown in Fig. 4 to preliminarily form the vaporous material in the inner chamber 40 before the motor is energized. This may readily be accomplished by closing the switch 84 and also the switch 81. The resistor 83 is thus short-circuited and current through the heater 76 will be greater than normal, thus developing sufficient heat in this heater to expel the vaporous material even under the pressures existing in this inner chamber before the motor is started. If this mode of operation is followed, the rotor can be surrounded by the vaporous material before the motor is energized. Following energization of the motor the switch 84 can be opened to allow the heater to perform its normal function of preliminarily heating the incoming throttled dielectric liquid or in some instances the auxiliary heater can be continuously energized to a degree sufficient to itself heat the dielectric liquid to the desired vaporizing or gas-expelling temperature.

Figure 3:
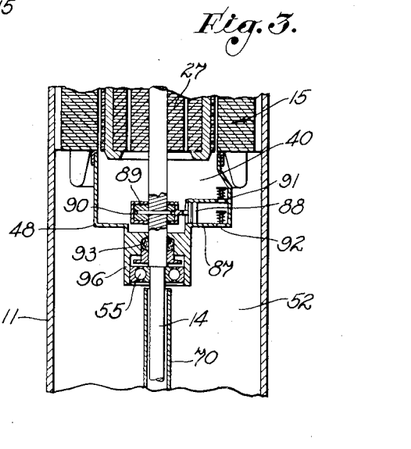
Fig. 3 is a fragmentary view illustrating the use of a reciprocating type of auxiliary pump in place of the centrifugal pump shown in Fig. 2, for instance.

In some instances it is preferable to use a reciprocating pump rather than the centrifugal type of auxiliary pump shown in Figs. 1 and 2. Such a system is shown in Fig. 3 and illustrates a cylinder 87 suitably formed in or connected to the lower wall 48 and in which cylinder a piston 88 is reciprocated by any suitable means. Preferably this piston is reciprocated when the shaft 14 is rotating, and in the form shown an eccentric 89 is mounted on this shaft, there being a follower 90 which surrounds this eccentric and moves the piston through a reciprocating cycle in a well-known manner. An intake valve 91 is shown communicating between the cylinder and the inner chamber 40, while an exhaust valve 92 communicates between the cylinder and the lower cooling chamber 52. If desired, a packing 93 may close the junction of the shaft and the lower wall 48. So also in this combination the bearing 55 is shown as being retained in a downward extending portion 96 of the lower wall.

In the systems thus far disclosed, the pressure inside the shell is maintained substantially equal to the pressure of the external fluid due to the action of the pressure-equalizing or storage chamber 30. In the form of the invention shown in Fig. 5 a differential pressure is maintained between the interior and exterior of the motor shell 11. Here the shaft 14 is sealed with respect to the upper wall 13 by a packing 100 or other type of sealing means on opposite sides of which it is desirable to maintain the differential pressure so that any leakage will be outward rather than inward. Thus, it is usually unobjectionable to allow a small amount of the dielectric liquid to escape through the packing 100, but the motor would be quickly burned out if any of the external fluid entered the motor chamber through this packing. Maintenance of a suitable differential pressure will preclude entrance of this external fluid.

Figure 5:
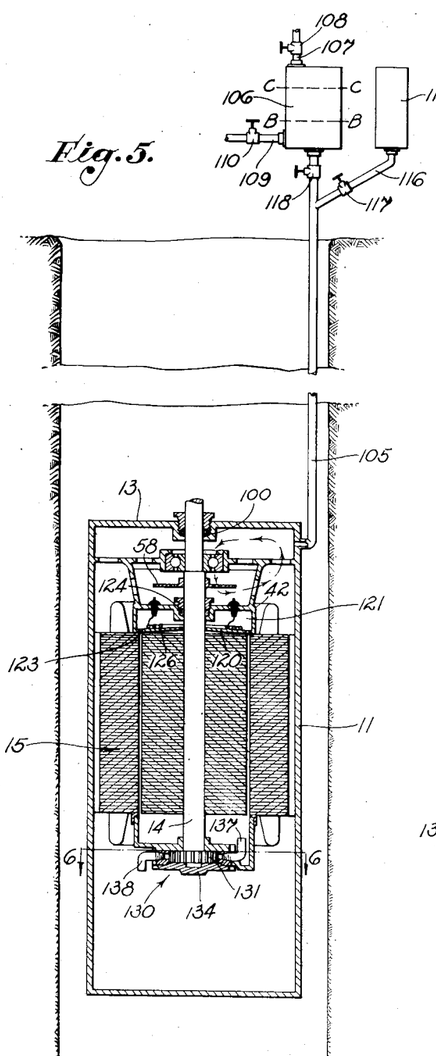
Fig. 5 is a vertical sectional view of an alternative form of the invention installed in a well.
Figure 6:
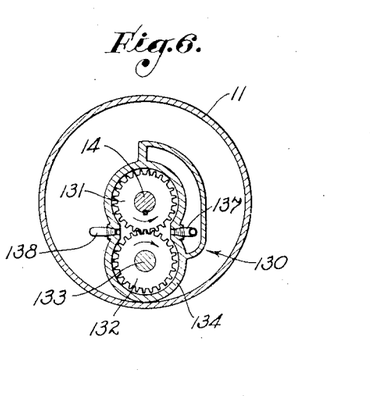
Fig. 6 is a sectional view taken on the line 6—6 of Fig. 5.

In the form shown this differential pressure is maintained by a head of the dielectric liquid in a vertically extending pipe 105 which preferably extends to the surface of the ground if the motor is operated in a well. The upper end of this pipe is shown as communicating with a storage tank 106 which provides a chamber which may be vented to the atmosphere through a pipe 107 including a suitable valve 108. A drain 109 is provided for this storage tank, this drain being closed by a valve 110. The pipe 105 and the storage tank 106 may comprise a storage chamber, the liquid therein being at such a level that the internal pressure on the shell 11 is maintained greater than the external pressure thereon, or the pipe 105 may itself provide such a storage chamber. In some instances it is desirable to fill this storage chamber to a level B—B when the motor is stationary. When the auxiliary pump comes into operation this level B—B will be raised due both to the slight amount of liquid pumped from the inner chamber 40 by the action of the auxiliary pump and due to the formation of vaporous material which displaces the dielectric liquid from at least a portion of this inner chamber. Thus, during the operation of the motor the level in the storage tank may be raised to a level C—C. The valve 108 may be either open or closed during the normal operation of the system. If closed, the upper end of the storage tank will entrap a body of air which will be compressed as the level of the dielectric liquid therein rises. When the motor is shut down, the level of the dielectric liquid will drop as the inner chamber 40 again fills with dielectric liquid. It will be clear, however, that if the level in the storage means formed by the pipe 105 either in itself or in conjunction with the storage tank 106 is maintained a distance above the level of the well liquid, the desired differential pressure can be maintained at all times. As shown, the pipe 105 is preferably of small diameter while the cross-sectional area of the storage tank 106 is considerably larger. Such a system is advantageous not only in adding additional dielectric liquid to the motor as will be hereinafter described, but is also desirable in that the change in level therein is smaller; i. e., the distance between the levels B—B and C—C is smaller than if the storage tank 106 were made smaller.

By connecting a supply tank 115 to the pipe 105 as by an auxiliary pipe 116 including a valve 117, it becomes possible to renew the dielectric medium in the motor shell from time to time. Thus, if during the operation of the motor a valve 118 in the pipe 105 is closed and the valve 117 is opened, a new supply of dielectric medium will move from the supply tank 115 into the pipe 105 and to the motor when the motor is de-energized and the inner chamber 40 fills with dielectric liquid. Thereafter the valve 117 may be closed and the excess dielectric liquid drained from the storage tank 106 by opening the valve 110. Before the motor is de-energized it is desirable to open the valve 118, it being understood that this valve is normally retained open during the operation of the pump except when it is desired to send a new supply of dielectric medium to the motor shell through the pipe 116.

The internal structure of the form of the invention shown in Fig. 5 is slightly different from the structures heretofore described. In this connection, no balance chamber is shown and a baffle 120 is shown as extending across the upper wall 42 to define an intermediate chamber 121. The baffle 120 may extend in close proximity to the shaft 14 if desired, this baffle being preferably inclined so that any dielectric liquid entering the chamber 121 moves outward along the baffle and through one or more ports 123 provided therein and communicating either with the gap, as shown, or with longitudinal openings formed through the rotor, as indicated in Fig. 2.

A packing structure 124 is shown between the upper wall 42 and the shaft 14, though this is not always necessary. This packing means may act as a throttle means for delivering a small amount of the dielectric liquid into the intermediate chamber 121. In other instances this throttle means may comprise any restricted passage between the top wall 42 and the shaft, or may comprise one or more small openings through this top wall.

The intermediate chamber 121 acts as a heating chamber, there being a heater 126 therein shown as being in the form of a coiled and suitably insulated resistance wire disposed immediately above the baffle 120. Any incoming dielectric liquid moving through the throttle means and into the intermediate chamber 121 is thus preliminarily heated before it moves through the ports 123. If desired, this heater may act merely as a preliminary heater and develop insufficient heat to expel the vaporous material from the dielectric material, allowing the windings of the motor to perform this final result. In other instances the heater 126 may itself form the vaporous material. This heater may be directly connected to the windings of the stator or may be connected to an independent circuit energized from the top of the ground as indicated in Fig. 4.

A supplementary pumping means may be used to circulate the dielectric liquid in the upper chamber 47 to insure cooling thereof, this means being in the form of the plate 58 heretofore described and setting up a circulation path as indicated by the arrows.

So also, in Fig. 5 we have shown a different type of auxiliary pump at the bottom of the inner chamber 40. This pump is indicated in general by the numeral 130 and is in the form of a gear pump. Such a pump has been diagrammatically illustrated as including a gear 131 connected to the shaft 14 and meshing with an idler gear 132 mounted on a shaft 133. This shaft 133 is journalled in a suitable casing 134 in which the gears rotate in a well-known manner. Dielectric liquid or vaporous material is drawn into the pump through a pipe 137 and is discharged therefrom through a pipe 138. In this form of the invention it is not necessary to use a pressure-equalizing or storage chamber 30 in the bottom of the motor shell.

In each of the forms of the invention hereinbefore described it will be clear that the required heat can be developed either by the windings of the motor or by an auxiliary heater, or by both. Thus, in the appended claims the terms "heating" and "heating means" are not confined to any particular one of these heat-developing means, the windings of the motor being in this capacity considered as elements not necessarily included in the terms "rotor" or "stator".

Although we have herein shown and described our invention in simple and practical form, it is recognized that certain parts or elements thereof are representative of other parts, elements or mechanisms which may be used in substantially the same manner or in different manners to accomplish the same or different results. Therefore, it is to be understood that the invention is not to be limited to the details disclosed herein, but is to be accorded the full scope of the following claims.

We claim as our invention:

1. A method of reducing skin friction in a dynamo-electric machine including a rotor and a stator spaced to form a gap therebetween, said gap having access to a dielectric liquid normally tending to enter said gap, said stator including a winding, which method includes the steps of: reducing the pressure on a portion of said dielectric liquid; heating said dielectric liquid at said reduced pressure to a temperature to expel a vaporous material therefrom; substantially filling said gap with said vaporous material while maintaining said stator winding in contact with said dielectric liquid thereby preventing filling of said gap by said dielectric liquid; and cooling said dielectric liquid and any excess of said vaporous material to reunite said vaporous material with said dielectric liquid.

2. A method of reducing skin friction in a dynamo-electric machine including a rotor and a wound stator spaced to form a gap therebetween, said gap having access to a dielectric liquid normally tending to enter said gap, which method includes the steps of: heating said dielectric liquid at a position spaced from the winding of said stator and from said gap to a temperature below the temperature necessary to expel therefrom a vaporous material; and further heating said dielectric liquid in said gap to a temperature sufficient to expel said vaporous material therefrom, said vaporous material at least partially filling said gap to prevent filling of said gap by said dielectric liquid to decrease the skin-friction losses therein.

3. A method of reducing skin friction in a dynamo-electric machine including a rotor and a stator spaced to form a gap therebetween, said gap having access to a dielectric liquid normally tending to enter said gap, which method includes the steps of: bringing into communication with said gap a dielectric liquid capable when heated of expelling a vaporous material; reducing the pressure in said gap to a value below the pressure of said dielectric liquid exterior of said gap;

heating said dielectric liquid at said reduced pressure to a degree sufficient to expel said vaporous material; and at least partially filling said gap with said vaporous material to prevent filling of said gap by said dielectric liquid to decrease the skin-friction losses therein.

4. A method of reducing skin-friction losses in a motor gap between a rotor and a stator, said gap having access to a dielectric liquid normally tending to enter said gap, which method includes the steps of: heating a dielectric liquid to a degree sufficient to expel therefrom a vaporous material; substantially filling said gap with said vaporous material before said motor is energized to displace at least a portion of said dielectric liquid therefrom; and subsequently energizing said motor.

5. A method of reducing skin-friction losses in a motor gap between a rotor and a stator, said gap having access to a dielectric liquid normally tending to enter said gap, which method includes the steps of: preliminarily heating a dielectric liquid to a degree sufficient to expel therefrom a vaporous material; substantially filling said gap with said vaporous material before said motor is energized to displace at least a portion of said dielectric liquid therefrom; and subsequently energizing said motor, and after said motor is energized reducing the degree to which said dielectric liquid is preliminarily heated, allowing the heat developed by said motor to expel said vaporous material from said dielectric liquid.

6. In combination in a dynamo-electric machine: a shell; a stator in said shell; a rotor in said shell journalled to rotate adjacent said stator, there being a gap therebetween; a dielectric liquid communicating with said gap and acting when heated to expel a vaporous material; heating means for heating said dielectric liquid; and pump means for decreasing the pressure in said gap, said heating means developing sufficient heat to expel said vaporous material from said dielectric liquid at the pressure maintained by said pump.

7. In combination in a dynamo-electric machine: a shell; a stator in said shell; a rotor in said shell and journalled to rotate adjacent said stator, there being a gap therebetween; a dielectric liquid in said shell and capable when heated of expelling a vaporous material; walls defining an inner chamber in said shell and in which said rotor is positioned; pump means intaking from said inner chamber for decreasing the pressure therein; and a heating means for heating said dielectric liquid sufficiently to expel said vaporous material from said dielectric liquid at the pressure maintained in said inner chamber by said pump.

8. A combination as defined in claim 7 including walls forming an intermediate chamber in communication with said dielectric liquid and with said inner chamber, said pump means forcing a portion of said dielectric liquid through said intermediate chamber and into said inner chamber.

9. A combination as defined in claim 7 including walls forming an intermediate chamber in communication with said dielectric liquid and with said inner chamber, said pump means forcing a portion of said dielectric liquid through said intermediate chamber and into said inner chamber, said heating means including a heater disposed to heat said dielectric liquid moving through said intermediate chamber.

10. A combination as defined in claim 7 including a throttle means throttling a flow of said dielectric liquid into said inner chamber, said dielectric liquid being drawn through said throttle means by said pump.

11. A combination as defined in claim 7 including a throttle means throttling a flow of said dielectric liquid into said inner chamber, said dielectric liquid being drawn through said throttle means by said pump, said throttle means including a pipe, said heating means including a heater adjacent said pipe for heating the dielectric liquid flowing therethrough.

12. A combination as defined in claim 7 including a throttle means throttling a flow of said dielectric liquid into said inner chamber, said dielectric liquid being drawn through said throttle means by said pump, and in which said heating means includes a heater in the path of travel of said dielectric liquid flowing through said throttle means.

13. A combination as defined in claim 7 in which said heating means includes a winding on said stator and in which said walls forming said inner chamber include an upper wall above said rotor and extending inward from a position inside said stator winding and a lower wall below said rotor and extending inward from a position inside said stator whereby said dielectric liquid in said shell is in cooling relationship with said stator winding.

14. In combination in a dynamo-electric machine: a shell; walls defining an inner chamber in said shell, said walls including two end walls; a stator in said shell; a rotor adjacent said stator and positioned in said inner chamber, said rotor and said stator cooperating to define a gap; a shaft operatively connected to said rotor and extending through each of said end walls; and two pumping means, one being at the junction of said shaft and each of said end walls, each of said pumping means intaking from said inner chamber.

15. A combination as defined in claim 14 in which the pumping action of one of said pump means is stronger than the pumping action of the other to establish a net flow through said inner chamber.

16. In combination in a dynamo-electric machine: walls defining an inner chamber; a stator; a rotor in said inner chamber and cooperating with said stator in providing a gap; walls in said inner chamber and forming a cup; means for circulating a medium through said inner chamber; and walls defining a passage through said walls defining said inner chamber, said passage communicating with said inner chamber and with said cup, said medium being moved through said passage by said means.

17. A combination as defined in claim 16 in which said rotor provides passages therethrough communicating with said cup and conducting at least a portion of said fluid from one end of said rotor to the other.

18. In a dynamo-electric machine, the combination of: a shell; walls defining an inner chamber in said shell; a stator in said shell and providing a winding exterior of said inner chamber; a rotor adjacent said stator and cooperating therewith in defining a gap, said rotor being positioned in said inner chamber; a shaft operatively connected to said rotor and extending from said inner chamber and from said shell; a sealing means at the junction of said shaft and said shell, said sealing means providing an inner portion communicating with the interior of said shell and an outer portion communicating with the exterior of said shell; and means for maintaining the pressure on said inner portion of said sealing means greater than the pressure on said outer portion thereof, said means including a pump means in said shell and intaking from said inner chamber, the discharge pressure of said pump being delivered to said inner portion of said sealing means.

19. A combination as defined in claim 18 including a dielectric liquid in said shell and including a storage means communicating with the discharge of said pump means, said storage means including a pipe extending upward from said shell to permit said dielectric liquid to rise therein until the pressure head in said pipe substantially equals the pressure head corresponding to the discharge pressure of said pump.

20. In combination in a submersible electric motor; a shell submerged in an external fluid; a shaft extending from said shell; a rotor operatively connected to said shaft; a sealing means at the junction of said shaft and said shell, said sealing means including an inner portion communicating with the interior of said shell and an outer portion communicating with said external fluid, said shell containing a dielectric liquid in communication with said inner portion of said sealing means; a pipe communicating with said shell and extending to a point above the level of said external fluid, said pipe containing sufficient of said dielectric liquid to build up a pressure in said shell greater than the pressure outside said shell whereby the pressure on said inner portion of said sealing means is greater than the pressure on said outer portion of said sealing means; means for displacing a portion of said dielectric liquid from said shell, said portion flowing into said pipe and raising the level therein; valve means in said pipe below the level of said dielectric liquid therein; and means for supplying dielectric liquid to said pipe at a position below said valve means.

21. In combination in a submersible electric motor: a shell submerged in an external fluid; a shaft extending from said shell; a rotor operatively connected to said shaft; a sealing means at the junction of said shaft and said shell, said sealing means including an inner portion communicating with the interior of said shell and an outer portion communicating with said external fluid, said shell containing a dielectric liquid in communication with said inner portion of said sealing means; a pipe communicating with said shell and extending to a point above the level of said external fluid, said pipe containing sufficient of said dielectric liquid to build up a pressure in said shell greater than the pressure outside said shell whereby the pressure on said inner portion of said sealing means is greater than the pressure on said outer portion of said sealing means; means for displacing a portion of said dielectric liquid from said shell, said portion flowing into said pipe and raising the level therein; and a storage tank at the top of said pipe and in open communication therewith and providing a chamber of larger cross-sectional area than said pipe.

22. In combination in a dynamo-electric machine: walls defining an inner chamber; a rotor in said inner chamber; a stator adjacent said rotor and providing a winding outside said inner chamber; an outer shell in which said rotor and said stator are positioned, said outer shell containing a dielectric liquid in cooling relationship with said stator winding; a shaft operatively connected to said rotor and extending from said inner chamber; and pump means intaking from said inner chamber for lowering the pressure therein below the pressure of said dielectric liquid in said outer shell exterior of said inner chamber.

23. In combination: a shell containing a dielectric liquid capable when heated of expelling a vaporous material; a dynamo-electric machine including a stator and a rotor in said shell and defining a gap therebetween communicating with said dielectric liquid, said dielectric liquid normally tending to fill said gap; heating means for heating said dielectric liquid sufficiently to expel said vaporous material therefrom, said heating means including a winding on said dynamo-electric machine and including an auxiliary electric heater; circuit means connected to said winding of said dynamo-electric machine for energizing said winding to develop in said gap a temperature sufficient to expel said vaporous material from said dielectric liquid; and means for separately energizing said auxiliary heater, said last-named means including a circuit means connected to said auxiliary heater and a switch means therein permitting separate energization of said auxiliary electric heater.

24. In combination with a dynamo-electric machine including a rotor and a stator defining a gap therebetween: a shell surrounding said rotor and said stator and containing a dielectric liquid capable when heated of expelling a vaporous material, said dielectric liquid communicating with said gap and normally tending to enter therein; an electric heater in said shell for heating said dielectric liquid to a degree sufficient to expel said vaporous material at a position communicating with said gap whereby said vaporous material substantially fills said gap to prevent filling thereof by said dielectric liquid; circuit means electrically connected to said electric heater; means for delivering to said heater through said circuit means a potential high enough to develop said degree of heat sufficient to expel said vaporous material; and means for delivering to said heater through said circuit means a lower potential insufficient to develop said degree of heat necessary to expel said vaporous material but which heat together with the heat developed in said dynamo-electric machine when operating will expel said vaporous material from said dielectric liquid.

25. In combination in a dynamo-electric machine; a stator; a rotor adjacent said stator and defining a gap; walls defining an inner chamber which in conjunction with said gap completely surrounds said rotor, said walls including a pair of end walls spaced from opposite ends of said rotor and extending inward from said stator; an outer shell around said walls and providing a space containing a dielectric liquid capable when heated to the temperature existing in said gap of expelling a vaporous material; a winding on said stator extending therefrom into said space to be contacted by said dielectric liquid; and pump means communicating between said dielectric liquid and said inner chamber and developing a pressure difference between said space and said inner chamber for introducing dielectric liquid into said inner chamber, said winding on said stator heating said gap to a degree sufficient to expel said vaporous material from said dielectric liquid to substantially fill said inner chamber and said gap whereby said rotor turns in an atmosphere of said vaporous material, the presence of said vaporous material preventing filling of said inner chamber by said dielectric liquid.

26. A combination as defined in claim 25 in which said dielectric liquid in said space is under a relatively high pressure, and in which said pump means intakes from said inner shell and discharges into said space to decrease the pressure in said inner chamber to a value at which said expelling of said vaporous material takes place at the temperature developed in said gap by said stator winding.

27. A method of operating a dynamo-electric machine including a rotor and a stator enclosed in a shell and spaced from each other to define a gap, which method includes the steps of: maintaining in said shell a dielectric liquid capable when heated of expelling a vaporous material; and increasing the pressure inside said shell relative to the pressure exterior thereof by locally heating said dielectric liquid to a degree sufficient to expel said vaporous material whereby said vaporous material displaces a portion of said dielectric liquid from the zone of said localized heating to increase the pressure inside said shell.

28. A method of operating a dynamo-electric machine including a rotor and a stator positioned in a shell and spaced to define a gap, which method includes the steps of: maintaining in said shell a dielectric liquid normally tending to enter said gap but capable of expelling a vaporous material at the temperature existing in said gap when said dynamo-electric machine is energized; increasing the pressure inside said shell relative to the pressure exterior thereof by locally heating a portion of said dielectric liquid to the degree necessary to expel said vaporous material therefrom; and substantially filling said gap with said vaporous material to displace dielectric liquid therefrom whereby the dielectric liquid displaced by said vaporous material acts to increase the pressure inside said shell.

29. A method of reducing skin friction in a dynamo-electric machine including a rotor and a wound stator spaced to form a gap therebetween, which method includes the steps of: maintaining in communication with said gap a dielectric liquid capable when sufficiently heated of expelling a vaporous material, said dielectric liquid normally tending to enter said gap; preliminarily heating said dielectric liquid by applying heat thereto at a position spaced from said gap and from the winding of said stator to a temperature below that necessary to expel said vaporous material; further heating said dielectric liquid adjacent said gap to a temperature sufficient to expel said vaporous material therefrom, said vaporous material substantially filling said gap to prevent filling thereof by said dielectric liquid; and maintaining the temperature in said gap at least as great as the temperature necessary to expel said vaporous material whereby said vaporous material is maintained in said gap to prevent filling thereof by said dielectric liquid.

30. A method of reducing skin friction losses in a motor gap between a rotor and a stator, said gap having access to a liquid normally tending to enter therein, which method includes the steps of: heating a dielectric liquid to a degree sufficient to expel therefrom a vaporous material; displacing said liquid from said gap by substantially filling said gap with said vaporous material before said motor is energized; and energizing said motor to develop sufficient heat in said gap to expel said vaporous material from said dielectric liquid and thereby maintain said gap substantially filled with said vaporous material.

31. A method of operating a dynamo-electric machine including a rotor and a stator enclosed in a shell, which method includes the steps of: maintaining in said shell a dielectric liquid capable when heated of expelling a vaporous material; reducing the pressure in a zone around said rotor to a value below the pressure in said shell exterior of said zone; and heating said dielectric liquid at such reduced pressure to a value to expel said vaporous material therefrom whereby said vaporous material contacts said rotor and substantially fills said zone to prevent filling of said zone by said dielectric liquid.

EARL MENDENHALL.
JUNIUS B. VAN HORN.